United States Patent
Kim et al.

(10) Patent No.: US 10,658,116 B2
(45) Date of Patent: May 19, 2020

(54) MULTILAYER CAPACITOR HAVING EXTERNAL ELECTRODE INCLUDING CONDUCTIVE RESIN LAYER

(71) Applicant: Samsung Electro-Mechanics Co., Ltd., Suwon-si, Gyeonggi-do (KR)

(72) Inventors: Jung Min Kim, Suwon-si (KR); Bon Seok Koo, Suwon-si (KR); Jung Wook Seo, Suwon-si (KR); Yoon Hee Lee, Suwon-si (KR); Kun Hoi Koo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/265,548

(22) Filed: Feb. 1, 2019

(65) Prior Publication Data

US 2019/0189349 A1 Jun. 20, 2019

Related U.S. Application Data

(62) Division of application No. 15/450,409, filed on Mar. 6, 2017, now Pat. No. 10,446,320.

(30) Foreign Application Priority Data

Apr. 15, 2016 (KR) .................. 10-2016-0046323
Dec. 21, 2016 (KR) .................. 10-2016-0176098

(51) Int. Cl.
*H01G 4/232* (2006.01)
*H01G 4/30* (2006.01)
*H01G 4/12* (2006.01)

(52) U.S. Cl.
CPC ............ *H01G 4/2325* (2013.01); *H01G 4/30* (2013.01); *H01G 4/12* (2013.01)

(58) Field of Classification Search
CPC ........ H01G 4/2325; H01G 4/30; H01G 4/232; H01G 4/12
See application file for complete search history.

(56) References Cited

U.S. PATENT DOCUMENTS 3,910,852 A * 10/1975 Lederman ............... H01B 1/22
  252/512
8,988,850 B1  3/2015 Kodama et al.
(Continued)

FOREIGN PATENT DOCUMENTS

CN  104576052 A  4/2015
CN  104871271 A  8/2015
(Continued)

OTHER PUBLICATIONS

Korean Decision to Grant a Patent dated Feb. 19, 2019 issued in Korean Patent Application No. 10-2016-0176098 (with English translation).

(Continued)

*Primary Examiner* — David M Sinclair
(74) *Attorney, Agent, or Firm* — Morgan, Lewis & Bockius LLP

(57) ABSTRACT

A multilayer ceramic capacitor comprises a body including dielectric layers and internal electrodes; and external electrodes disposed on external surfaces of the body, respectively, wherein each of the external electrodes includes a first electrode layer disposed on the one surface of the body and contacting the internal electrodes; a conductive resin layer disposed on the first electrode layer and including a plurality of metal particles, a conductive connecting part surrounding the plurality of metal particles, a base resin, and an intermetallic compound contacting the first electrode layer and (Continued)

the conductive connecting part; and a second electrode layer disposed on the conductive resin layer and contacting the conductive connecting part.

12 Claims, 8 Drawing Sheets

(56) References Cited

U.S. PATENT DOCUMENTS

| | | | |
|---|---|---|---|
| 9,087,644 | B2 | 7/2015 | Jeon et al. |
| 9,881,737 | B2 | 1/2018 | Kodama et al. |
| 10,446,320 | B2 | 10/2019 | Kim et al. |
| 2005/0012200 | A1 | 1/2005 | Sawada et al. |
| 2006/0044098 | A1 | 3/2006 | Kimura et al. |
| 2011/0303444 | A1* | 12/2011 | Yoshimura ............ H05K 3/4623 174/257 |
| 2013/0155573 | A1* | 6/2013 | Kim ....................... H01G 13/00 361/305 |
| 2014/0043724 | A1 | 2/2014 | Kang et al. |
| 2014/0085770 | A1 | 3/2014 | Park et al. |
| 2014/0192453 | A1 | 7/2014 | Hong et al. |
| 2015/0213953 | A1 | 7/2015 | Jun et al. |
| 2015/0279563 | A1 | 10/2015 | Otani |
| 2015/0279566 | A1 | 10/2015 | Otani |
| 2017/0032896 | A1 | 2/2017 | Otani |
| 2017/0098506 | A1 | 4/2017 | Ando et al. |
| 2017/0301468 | A1 | 10/2017 | Kim et al. |
| 2017/0330689 | A1 | 11/2017 | Hatanaka et al. |
| 2018/0166215 | A1 | 6/2018 | Hamanaka et al. |
| 2019/0295773 | A1 | 9/2019 | Kim et al. |

FOREIGN PATENT DOCUMENTS

| | | | |
|---|---|---|---|
| JP | H05-028829 | A | 2/1993 |
| JP | H08-037127 | A | 2/1996 |
| JP | 2001040497 | A * | 2/2001 |
| JP | 2005-051226 | A | 2/2005 |
| JP | 2009-146679 | A | 7/2009 |
| JP | 2010-010671 | A | 1/2010 |
| JP | 2012-104785 | A | 5/2012 |
| JP | 2013-161872 | A | 8/2013 |
| JP | 5390408 | B2 | 1/2014 |
| JP | 2015-026840 | A | 2/2015 |
| KR | 10-2014-0021416 | A | 2/2014 |
| KR | 10-2015-0086343 | A | 7/2015 |
| KR | 10-2015-0089276 | A | 8/2015 |
| WO | 2009/098938 | A1 | 8/2009 |
| WO | 2014/097823 | A1 | 6/2014 |

OTHER PUBLICATIONS

Office Action issued in corresponding U.S. Appl. No. 15/450,409, dated Mar. 14, 2019.

Office Action issued in related Korean Patent Application No. 10-2016-0176098 dated Jun. 18, 2018.

Office Action issued in related Chinese Patent Application No. 201410244146.4 dated Jul. 23, 2018.

Office Action issued in related U.S. Appl. No. 16/441,469, dated Jul. 9, 2019.

Office Action issued in corresponding U.S. Appl. No. 16/271,084 dated Oct. 22, 2019.

* cited by examiner

MULTILAYER CAPACITOR HAVING EXTERNAL ELECTRODE INCLUDING CONDUCTIVE RESIN LAYER

CROSS-REFERENCE TO RELATED APPLICATION(S)

This application is a divisional application of U.S. patent application Ser. No. 15/450,409, filed Mar. 6, 2017, which claims benefit of priority to Korean Patent Application No. 10-2016-0046323 filed on Apr. 15, 2016 and Korean Patent Application No. 10-2016-0176098 filed on Dec. 21, 2016 in the Korean Intellectual Property Office, the disclosures of which are incorporated herein by reference in its entirety.

BACKGROUND

1. Field

The present disclosure relates to a multilayer ceramic capacitor.

2. Description of Related Art

A multilayer ceramic capacitor is an important chip component used in communications devices, computers, home appliances, automobiles, and the like, within a wide range of industrial fields, since it has a small size, allows for the implementation of high capacitance, may be easily mounted, and is a core passive element, used particularly in various electric, electronic, and information communications devices such as mobile phones, computers, digital televisions (TV), and the like.

Recently, in accordance with miniaturization and improvements in the performance of electronic devices, multilayer ceramic capacitors have tended to be miniaturized and while having increased capacitance implemented therein. In accordance with this tendency, it has become important to secure high levels of reliability in multilayer ceramic capacitors.

As a method for securing high levels of reliability in the multilayer ceramic capacitors, as described above, a technology of using a conductive resin layer in an external electrode in order to absorb stress generated in a mechanical or thermal environment to prevent generation of cracks has been disclosed.

The conductive resin layer serves to electrically and mechanically bond an electrode layer and a plating layer in the external electrode of the multilayer ceramic capacitor to each other and also serves to protect the multilayer ceramic capacitor from impact from warpage of a circuit board at the time of mounting the multilayer ceramic capacitor on the circuit board.

However, in order for the conductive resin layer to serve to electrically and mechanically bond the electrode layer and the plating layer to each other and serve to protect the multilayer ceramic capacitor, resistance of the conductive resin layer should be low, and adhesion of the conductive resin layer bonding the electrode layer and the plating layer should be excellent, to prevent a delamination phenomenon of the external electrode from occurring.

However, the conductive resin layer according to the related art has high resistance, such that equivalent series resistance (ESR) thereof may be higher than that of a product that does not include the conductive resin layer.

SUMMARY

An aspect of the present disclosure may provide a multilayer ceramic capacitor in which electrical and mechanical adhesion between an electrode layer and a plating layer may be improved, resistance of a conductive resin layer may be decreased to decrease equivalent series resistance (ESR), and warpage strength may be improved.

According to an aspect of the present disclosure, a multilayer ceramic capacitor may be provided, in which an external electrode includes a first electrode layer, a conductive resin layer, and a second electrode layer contacting a conductive connecting part, and the conductive resin layer includes a plurality of metal particles, the conductive connecting part surrounding the plurality of metal particles in a melted state, a base resin, and an intermetallic compound contacting the first electrode layer and the conductive connecting part.

According to another aspect of the present disclosure, a multilayer ceramic capacitor may be provided, in which intermetallic compounds are disposed on exposed portions of internal electrodes, and an external electrode includes a conductive resin layer including a plurality of metal particles, a conductive connecting part surrounding the plurality of metal particles in a melted state and contacting the intermetallic compounds, and a base resin, and covering the intermetallic compounds, and a second electrode layer contacting the conductive connecting part.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
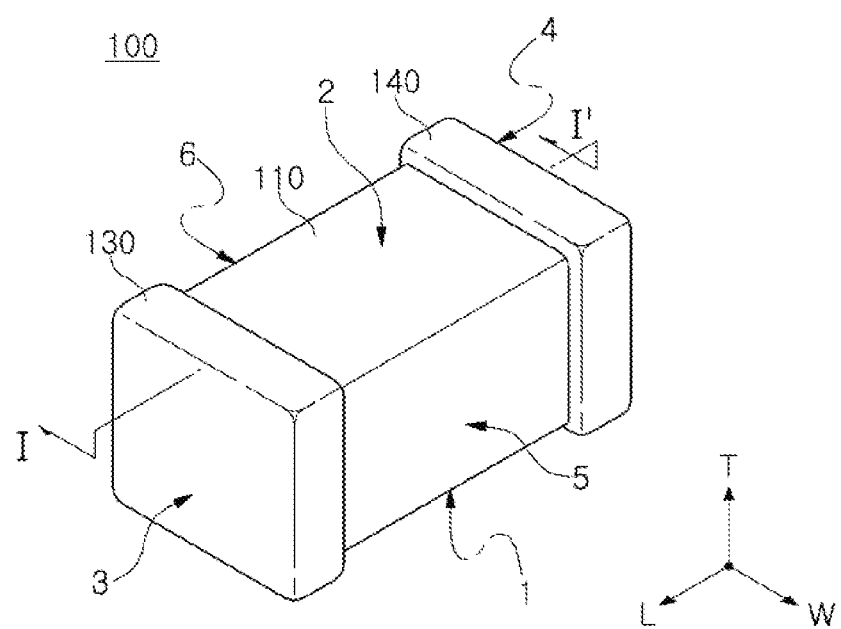
FIG. 1 is a schematic perspective view illustrating a multilayer ceramic capacitor according to an exemplary embodiment in the present disclosure.
Figure 2:
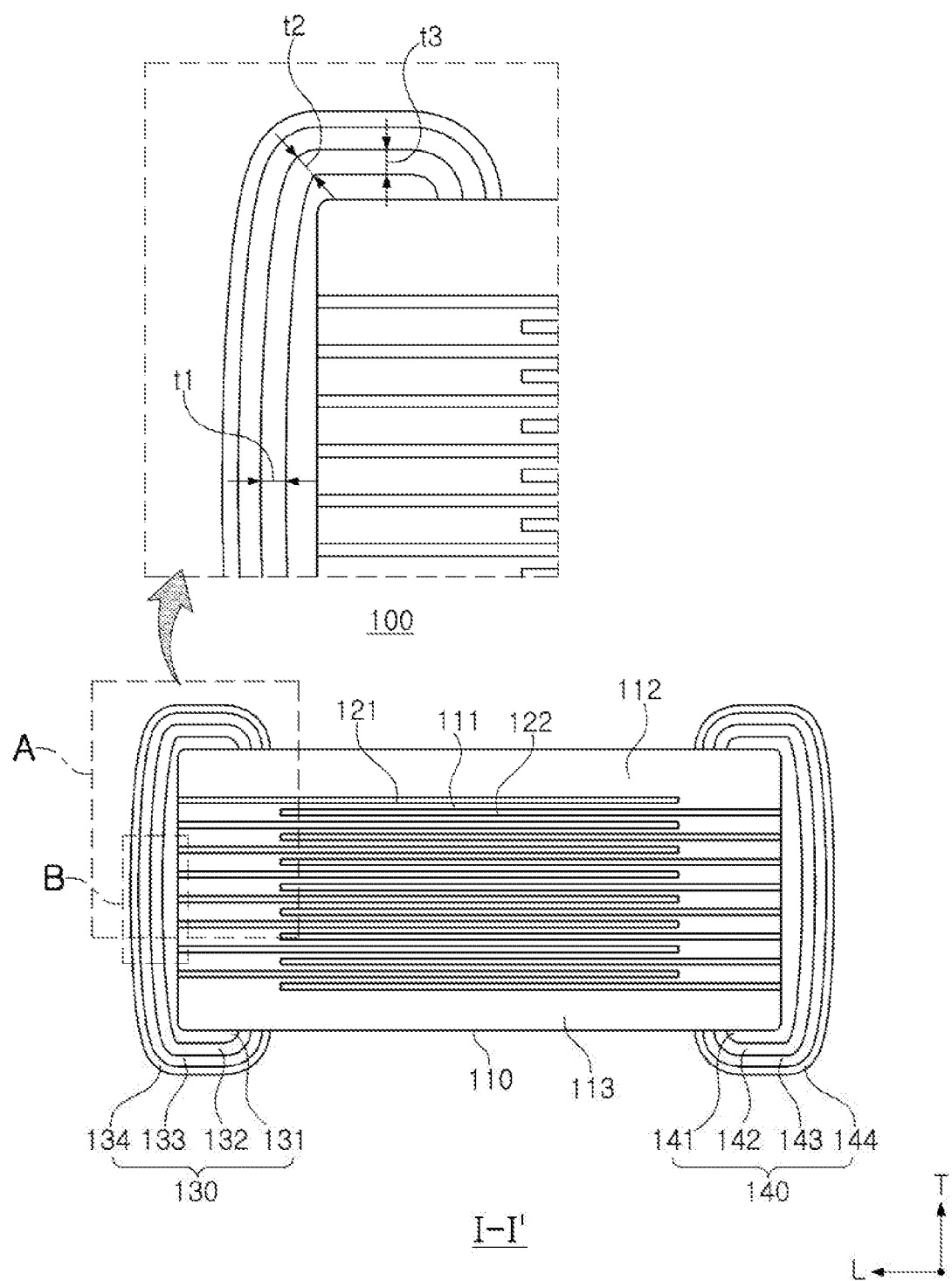
FIG. 2 is a cross-sectional view taken along line I-I' of FIG. 1.

FIG. 1 is a schematic perspective view illustrating a multilayer ceramic capacitor according to an exemplary embodiment in the present disclosure, and FIG. 2 is a cross-sectional view taken along line I-I' of FIG. 1.

Referring to FIGS. 1 and 2, a multilayer ceramic capacitor 100 according to the exemplary embodiment may include a body 110 and first and second external electrodes 130 and 140.

The body 110 may include an active region, which contributes to forming capacitance of the multilayer ceramic capacitor, and upper and lower covers 112 and 113 formed as upper and lower margin parts on upper and lower surfaces of the active region, respectively.

In the exemplary embodiment, a shape of the body 110 is not particularly limited, but may be substantially a hexahedral shape.

That is, the body 110 may have a shape substantially similar to the hexahedral shape even though it does not have a perfect hexahedral shape due to sintering shrinkage of ceramic powder particles at the time of sintering a chip, a difference in thickness depending on a disposition of internal electrodes, and polishing of corner portions.

A direction of a hexahedron will be defined in order to clearly describe exemplary embodiments in the present disclosure. L, W and T in the drawings refer to a length direction, a width direction, and a thickness direction, respectively. Here, the thickness direction may be the same as a stacking direction in which dielectric layers are stacked.

The active region may include a plurality of dielectric layers 111 and a plurality of first and second internal electrodes 121 and 122 alternately stacked with respective dielectric layers 111 interposed therebetween.

The dielectric layer 111 may include ceramic powder particles having a high dielectric constant, such as barium titanate ($BaTiO_3$)-based powder particles or strontium titanate ($SrTiO_3$)-based powder particles. However, a material of the dielectric layer 111 according to the present disclosure is not limited thereto.

In this case, a thickness of the dielectric layer 111 may be arbitrarily changed in accordance with a capacitance design of the multilayer ceramic capacitor 100. A thickness of one dielectric layer 111 after being sintered may be 0.1 to 10 μm in consideration of a size and capacity of the body 110. However, the thickness of one dielectric layer 111 according to the present disclosure is not limited thereto.

The first and second internal electrodes 121 and 122 may be disposed to face each other with respective dielectric layers 111 interposed therebetween.

The first and second internal electrodes 121 and 122, which are a pair of electrodes having different polarities, may be formed in the stacking direction of the dielectric layers 111 to be alternately exposed through both surfaces of the body 110 in a length direction of the body 110 by printing a conductive paste including a conductive metal at a predetermined thickness on the dielectric layers 111, and may be electrically insulated from each other by respective dielectric layers 111 disposed therebetween.

The first and second internal electrodes 121 and 122 may be electrically connected to the first and second external electrodes 130 and 140 through portions alternately exposed through both surfaces of the body 110 in the length direction of the body 110, respectively.

Therefore, when voltages are applied to the first and second external electrodes 130 and 140, electric charges may be accumulated between the first and second internal electrodes 121 and 122 facing each other. In this case, capacitance of the multilayer ceramic capacitor 100 may be in proportion to an area of a region in which the first and second internal electrodes 121 and 122 overlap each other.

Thicknesses of the first and second internal electrodes 121 and 122 may be determined depending on a use of the multilayer ceramic capacitor. For example, the thicknesses of the first and second internal electrodes 121 and 122 may be determined to be in a range of 0.2 to 1.0 μm in consideration of a size and capacity of the body 110. However, the thicknesses of the first and second internal electrodes 121 and 122 according to the present disclosure are not limited thereto.

In addition, the conductive metal included in the first and second internal electrodes 121 and 122 may be nickel (Ni), copper (Cu), palladium (Pd), or alloys thereof. However, the conductive metal included in the first and second internal electrodes 121 and 122 according to the present disclosure is not limited thereto.

The upper and lower covers 112 and 113 may be formed of the same material as that of the dielectric layers 111 of the active region and have the same configuration as that of the dielectric layers 111 of the active region except that they do not include the internal electrodes.

That is, the upper and lower covers 112 and 113 may be formed by stacking a single dielectric layer or two or more dielectric layers on the upper and lower surfaces of the active region, respectively, in the thickness direction, and may basically serve to prevent damage to the first and second internal electrodes 121 and 122 due to physical or chemical stress.

The first and second external electrodes 130 and 140 may include first electrode layers 131 and 141, conductive resin layers 132 and 142 disposed on the first electrode layers 131 and 141, and second electrode layers 133, 134, 143, and 144 disposed on the conductive resin layers 132 and 142, respectively.

Figure 3:
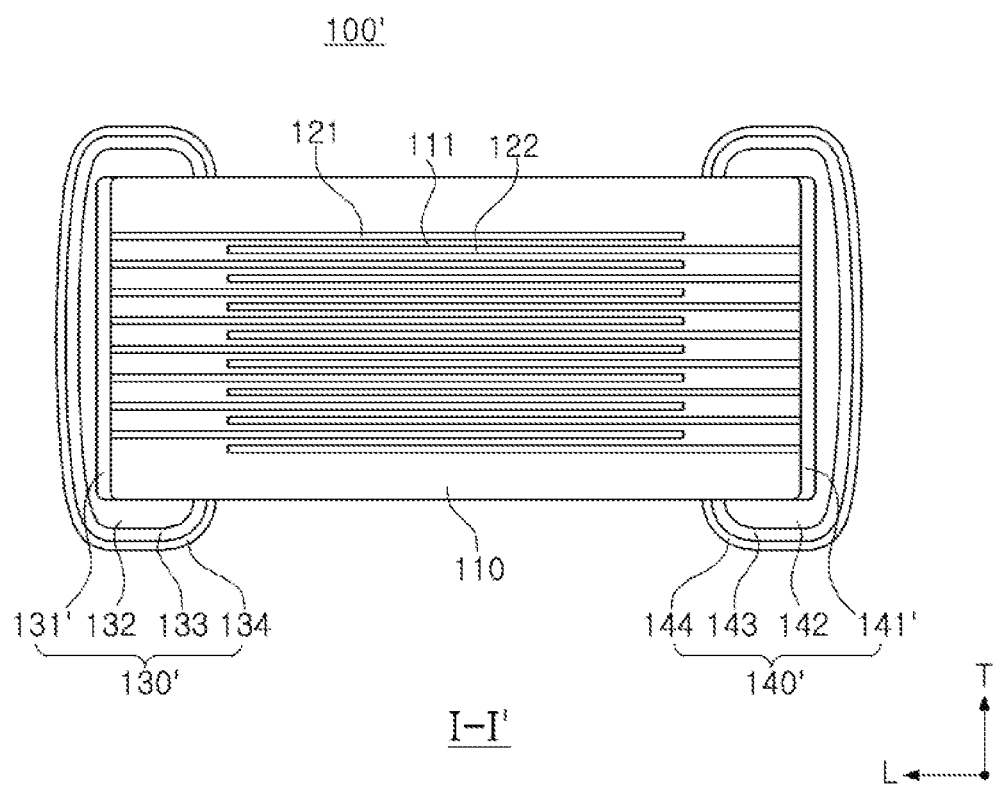
FIG. 3 is an enlarged cross-sectional view of region B of FIG. 2.

FIG. 3 is an enlarged cross-sectional view of region B of FIG. 2.

An enlarged view of a portion of the first external electrode 130 is illustrated in the region B, and a description will hereinafter be provided in relation to the first external electrode 130. However, this description may be considered as including a description for the second external electrode 140 since configurations of the first external electrode and the second external electrodes are similar to each other except that the first external electrode is electrically connected to the first internal electrodes and the second external electrode is electrically connected to the second internal electrodes.

The first electrode layer 131 may contact and be directly connected to the first internal electrodes 121 exposed through one surface of the body 110 in the length direction of the body 110, thereby securing electrical conduction between the first external electrode 130 and the first internal electrodes 121.

The first electrode layer 131 may include a metal component, and an example of the metal component may include nickel (Ni), copper (Cu), palladium (Pd), gold (Au), or alloys thereof. More preferably, sintered copper (Cu) may be used as the metal component.

In this case, the first electrode layer 131 may be extended from the one surface of the body 110 in the length direction of the body 110 to portions of both surfaces of the body 110 in the thickness direction of the body 110.

In addition, the first electrode layer 131 may be extended from the one surface of the body 110 in the length direction of the body 110 to portions of both surfaces of the body 110 in the width direction of the body 110.

Figure 4:
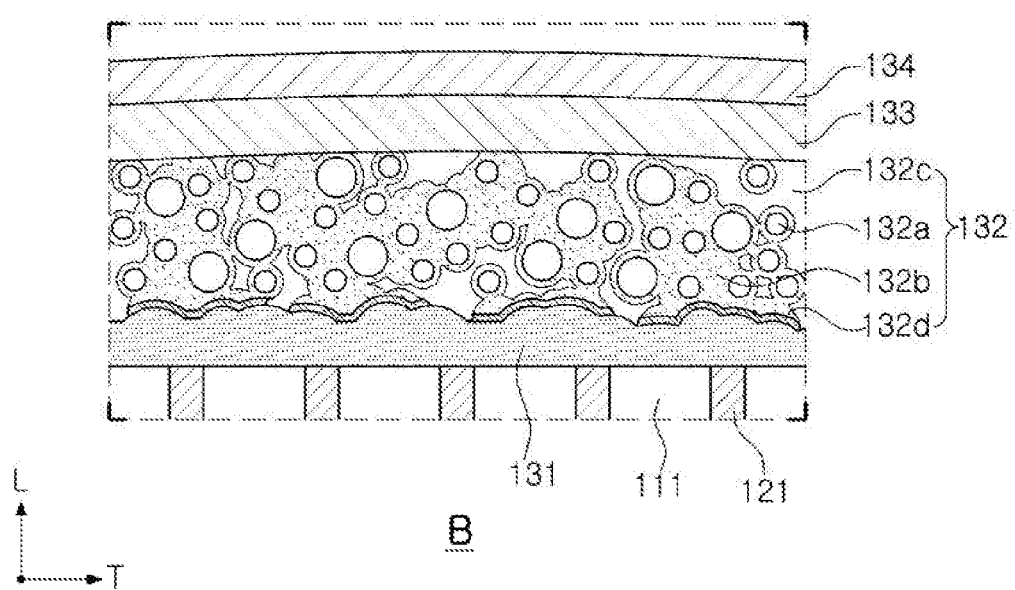
FIG. 4 is a schematic cross-sectional view illustrating a multilayer ceramic capacitor according to another exemplary embodiment in the present disclosure.

Meanwhile, as illustrated in FIG. 4, first electrode layers 131' and 141' of first and second external electrodes 130' and 140' may be formed on only both surfaces of the body 110 in the length direction of the body 110 without being extended to surfaces of the body 110 in the thickness direction of the body 110. In this case, warpage strength of the multilayer ceramic capacitor may be further improved.

As illustrated in FIG. 3, the conductive resin layer 132 may include a plurality of metal particles 132a, a conductive connecting part 132b, a base resin 132c, and an intermetallic compound 132d.

The conductive resin layer 132 may have a form in which the plurality of metal particles 132a are dispersed in the base resin 132c. In this case, a paste in which metal particles are dispersed in a resin may be used as an example of a material that may obtain the conductive resin layer 132, and since the conductive resin layer 132 is formed through processes of drying and hardening an applied paste in a case of applying the paste, the metal particles are not melted, unlike a method of forming an external electrode by sintering according to the related art, such that the metal particles may be present in a particle form in the conductive resin layer 132.

In this case, the metal particles 132a may include one or more selected from the group consisting of nickel (Ni), silver (Ag), copper (Cu) coated with silver (Ag), copper (Cu) coated with tin (Sn), and copper (Cu). More preferable, the metal particles 132a may be formed of only copper (Cu).

In addition, the metal particles 132a may have a size of 0.2 μm to 20 μm.

Figure 5:
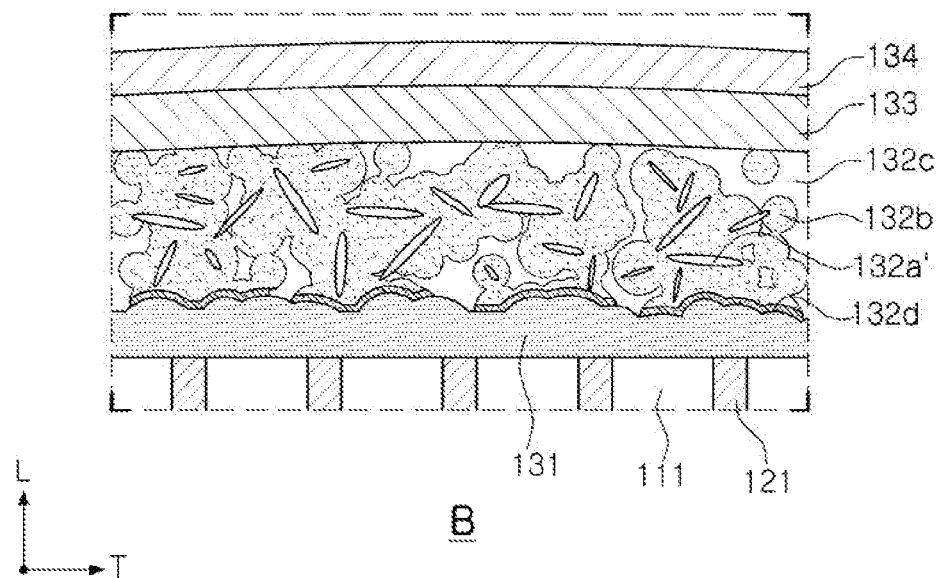
FIG. 5 is a cross-sectional view of region B of FIG. 2 illustrating metal particles having flake shapes.
Figure 6:
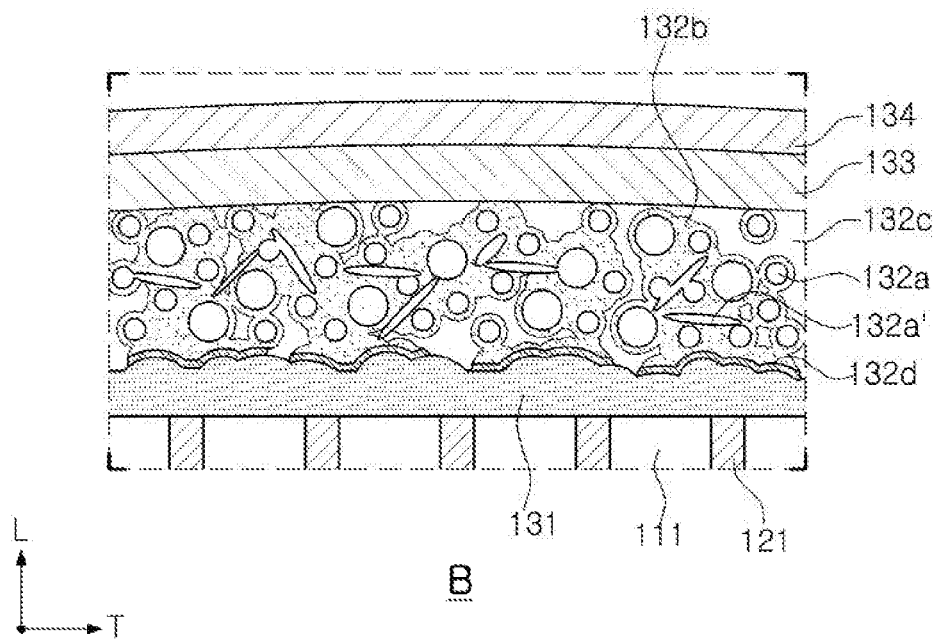
FIG. 6 is a cross-sectional view of region B of FIG. 2 illustrating metal particles having a mixture of spherical shapes and flake shapes.

Meanwhile, as illustrated in FIGS. 5 and 6, the metal particles may have spherical shapes, may have only flake shapes if necessary, or have a mixture of spherical shapes and flake shapes.

The conductive connecting part 132b may surround the plurality of metal particles 132a in a melted state to serve to connect the plurality of metal particles 132a to one another, thereby significantly decreasing internal stress of the body 110 and improving high temperature load and wet proof load characteristics.

In this case, a metal included in the conductive connecting part 132b may have a melting point lower than a hardening temperature of the base resin 132c.

That is, since the conductive connecting part 132b has the melting point lower than the hardening temperature of the base resin 132c, the conductive connecting part 132b may be melted in drying and hardening processes, and the conductive connecting part 132b may cover the metal particles 132a in the melted state, as illustrated in FIG. 3.

In this case, the metal of the conductive connecting part 132b may be a metal having a low melting point of 300° C. or less.

The intermetallic compound 132d may be disposed on the first electrode layer 131 to contact the first electrode layer 131, and may serve to decrease contact resistance between the conductive resin layer 132 and the first electrode layer 131. In addition, the intermetallic compound 132d may contact the conductive connecting part 132b to serve to connect the first electrode layer 131 and the conductive connecting part 132b to each other.

The intermetallic compound 132d may be formed of copper/tin (Cu/Sn).

The intermetallic compound 132d may be disposed in a form of a plurality of islands on the first electrode layer 131. In addition, the plurality of islands may have a layer form.

The base resin 132c may include a thermosetting resin.

In this case, the thermosetting resin may be, for example, an epoxy resin. However, the thermosetting resin according to the present disclosure is not limited thereto.

The base resin 132c may serve to mechanically bond the first and second electrode layers 131 and 133 to each other.

The second electrode layer may be a plating layer.

In this case, the second electrode layers 133 and 134 may have a structure in which a nickel (Ni) plating layer 133 and a tin (Sn) plating layer 134 are sequentially stacked as an example. The nickel (Ni) plating layer 133 may contact the conductive connecting part 132b and the base resin 132c of the conductive resin layer 132.

Figure 7:
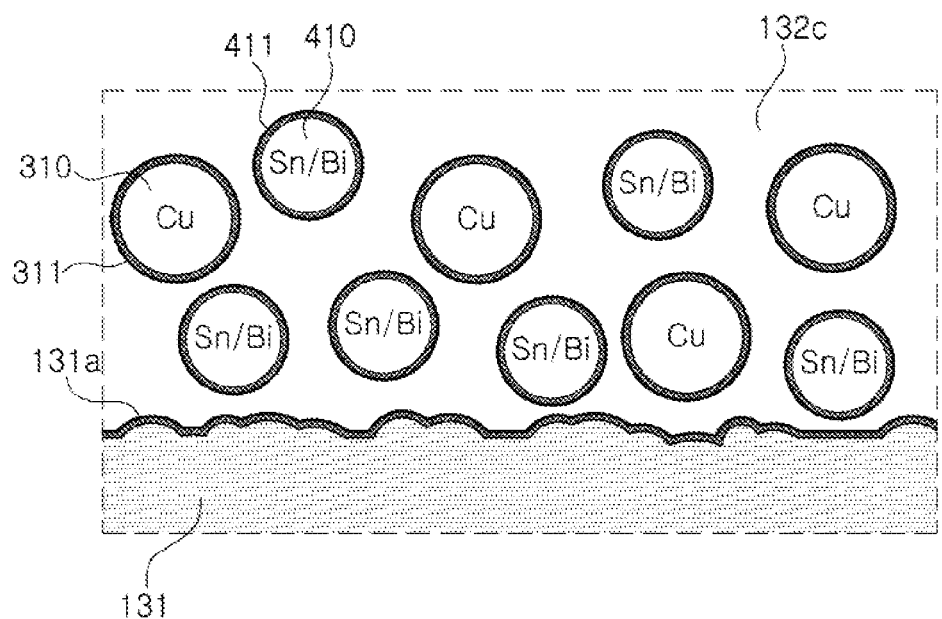
FIG. 7 is a view illustrating a state in which copper (Cu) particles and tin/bismuth (Sn/Bi) particles are dispersed in epoxy.
Figure 8:
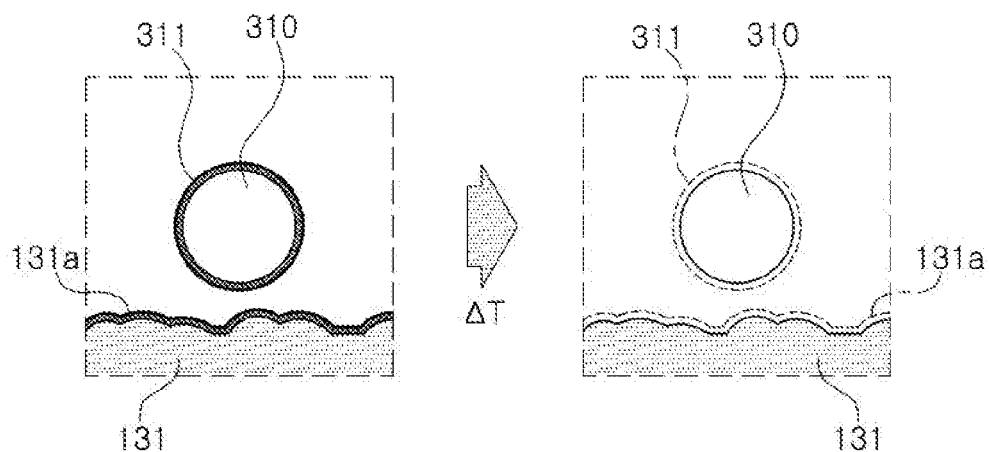
FIG. 8 is a view illustrating a state in which tin/bismuth (Sn/Bi) particles are melted to have flowability.
Figure 9:
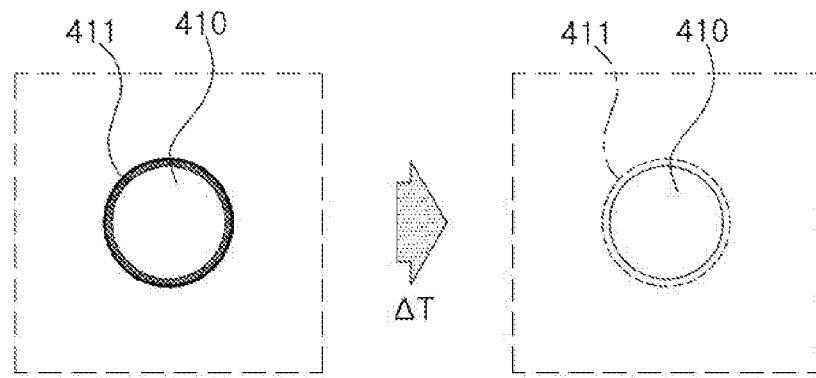
FIG. 9 is a view illustrating a state in which copper (Cu) particles and tin/bismuth (Sn/Bi) particles react to each other to form a copper/tin (Cu/Sn) layer.
Figure 10:
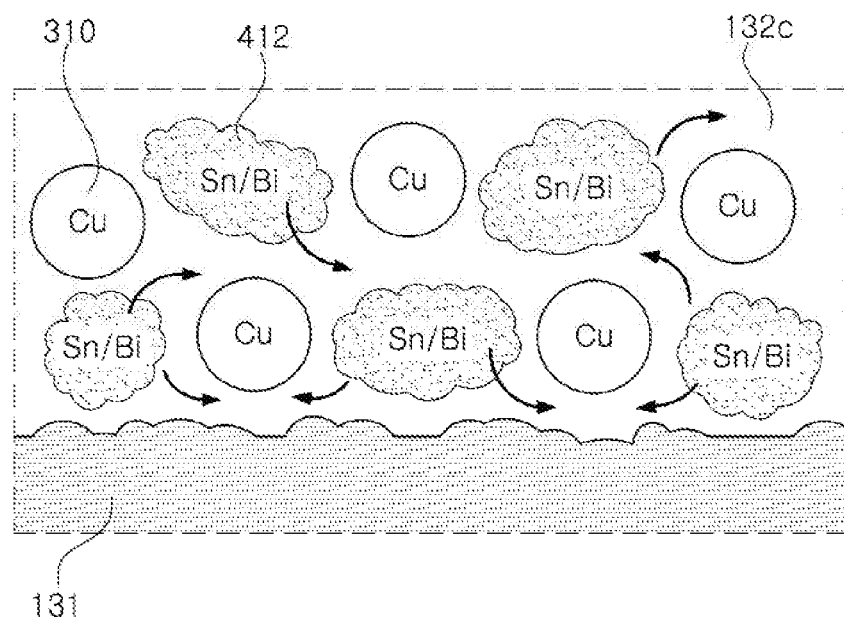
FIG. 10 is a view illustrating a state in which an oxide film of a copper (Cu) particle is removed by an oxide film remover or heat.
Figure 11:
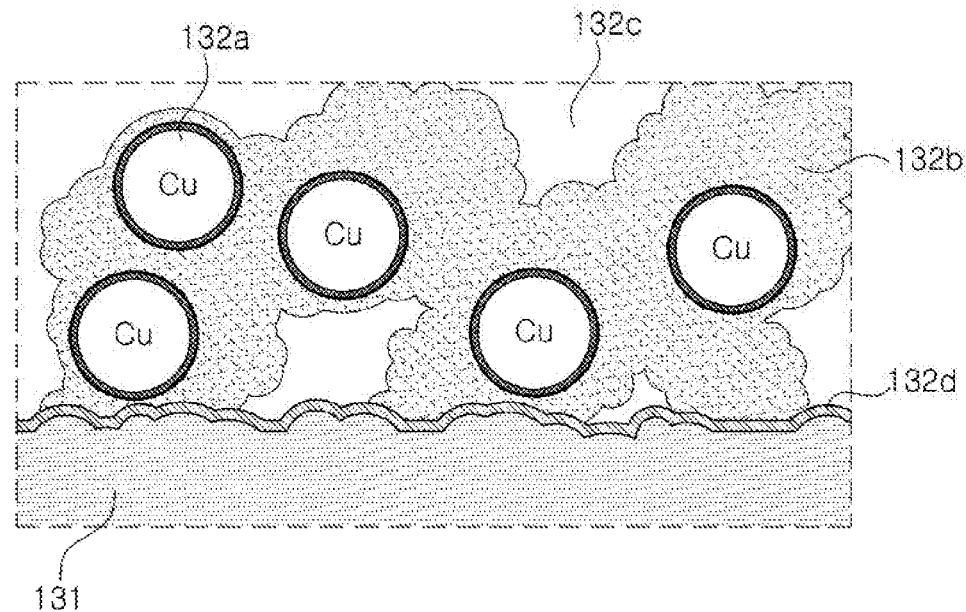
FIG. 11 is a view illustrating a state in which an oxide film of a tin/bismuth (Sn/Bi) particle is removed by an oxide film remover or heat.

FIG. 7 is a view illustrating a state in which copper (Cu) particles and tin/bismuth (Sn/Bi) particles are dispersed in epoxy, FIG. 8 is a view illustrating a state in which tin/bismuth (Sn/Bi) particles are melted to have flowability, FIG. 9 is a view illustrating a state in which copper (Cu) particles and tin/bismuth (Sn/Bi) particles react to each other to form a copper/tin (Cu/Sn) layer, FIG. 10 is a view illustrating a state in which an oxide film of a copper (Cu) particle is removed by an oxide film remover or heat, and FIG. 11 is a view illustrating a state in which an oxide film of a tin/bismuth (Sn/Bi) particle is removed by an oxide film remover or heat.

A mechanism of forming the conductive connecting part 132b using copper/tin (Cu/Sn) will hereinafter be described with reference to FIGS. 7 through 11.

Copper (Cu) particles 310 and tin/bismuth (Sn/Bi) particles 410 may have oxide films 311 and 411 present on surfaces thereof, respectively.

The oxide films may hinder a copper/tin (Cu/Sn) layer, a compound, from being formed by a reaction between the copper (Cu) particles and the tin/bismuth (Sn/Bi) particles, and may be removed by an oxide film remover included in epoxy or heat at the time of performing a hardening process or be removed by acid solution processing if necessary.

The oxide film remover may be an acid, a base, hydrogen halide, or the like. However, the oxide film remover according to the present disclosure is not limited thereto.

Then, the tin/bismuth (Sn/Bi) particles from which the oxide films are removed may start to be melted at about 140° C., and the melted tin/bismuth (Sn/Bi) particles may have flowability, move toward the copper (Cu) particles, and react to the copper (Cu) particles at a predetermined temperature to form the copper/tin (Cu/Sn) layer, a compound.

In addition, the tin/bismuth (Sn/Bi) particles may be surface-treated. Surface oxidation may be easy generated in the tin/bismuth (Sn/Bi) particles. In this case, the surface oxidation may hinder the copper/tin (Cu/Sn) layer from being formed.

Therefore, the tin/bismuth (Sn/Bi) particles may be surface-treated so that a content of carbon is 0.5% to 1.0% in order to prevent the surface oxidation.

Meanwhile, Sn/Bi is used as a low melting point metal particle in the present exemplary embodiment. Alternatively, Sn—Pb, Sn—Cu, Sn—Ag, or Sn—Ag—Cu may also be used as the low melting point metal particle.

In this case, it may be determined whether the copper/tin (Cu/Sn) layer, an intermetallic compound, is disposed on the first electrode layer depending on sizes, contents, compositions, and the like, of the copper (Cu) particles and the tin/bismuth (Sn/Bi) particles.

First, a size of the copper (Cu) particles for forming the copper/tin (Cu/Sn) layer may be 0.2 μm to 20 μm.

Figure 12:
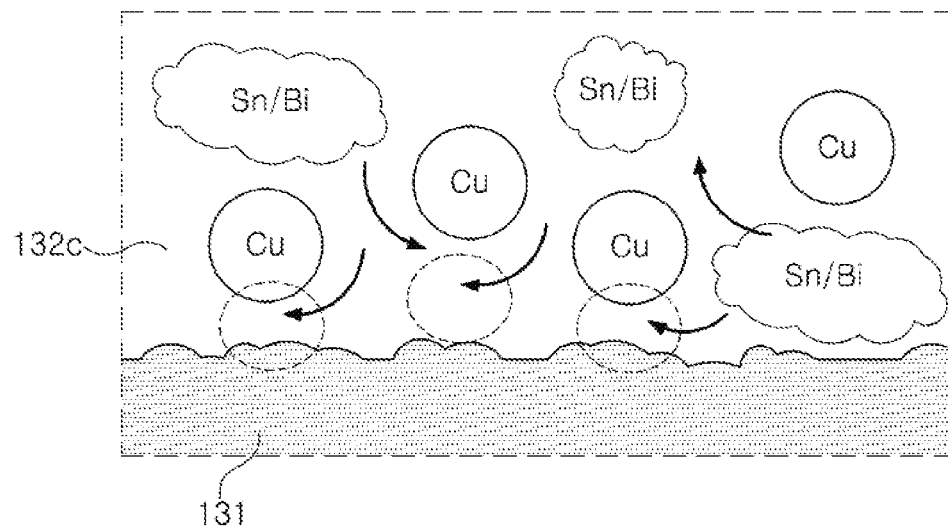
FIG. 12 is a view illustrating a flow of a tin/bismuth (Sn/Bi) solution in a case in which copper (Cu) particles are large at the time of forming a conductive resin layer.

In order to form the copper/tin (Cu/Sn) layer, the tin/bismuth (Sn/Bi) particles melted at a predetermined temperature to be present in a solution state need to flow to the surrounding of the copper (Cu) particles. However, as illustrated in FIG. 12, when the size of the copper (Cu) particles exceeds 20 μm, an interval between the first electrode layer and the copper (Cu) particles may be excessively wide, such that a tin/bismuth (Sn/Bi) solution may not easily move between the first electrode layer and the copper (Cu) particles, thereby hindering the copper/tin (Cu/Sn) layer from being formed.

Figure 13:
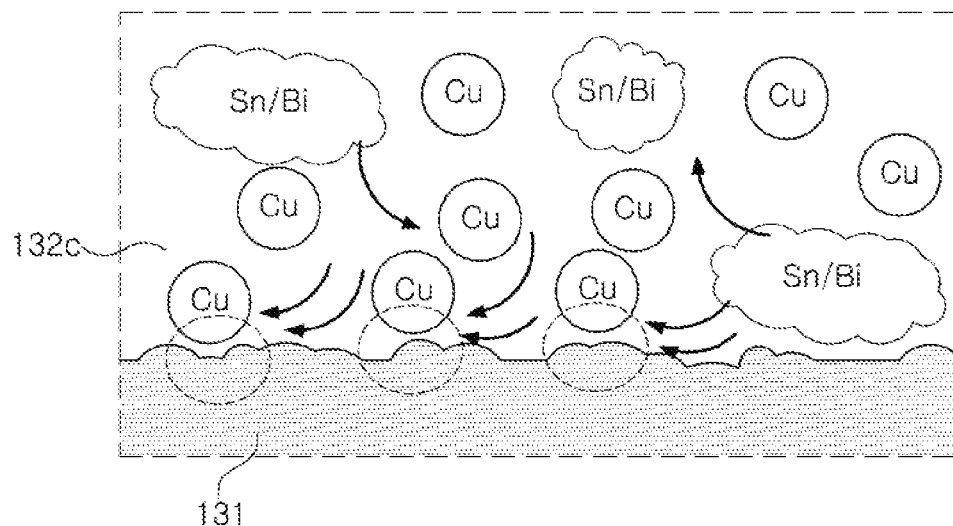
FIG. 13 is a view illustrating a flow of a tin/bismuth (Sn/Bi) solution in a case in which copper (Cu) particles are small at the time of forming a conductive resin layer.

To the contrary, as illustrated in FIG. 13, when the size of the copper (Cu) particles is 20 μm or less, a distance between the copper (Cu) particles may be decreased, and the tin/bismuth (Sn/Bi) solution may more easily move to a surface of the first electrode layer due to capillary force generated in regions in which the distance between the copper (Cu) particles is decreased, such that the copper/tin (Cu/Sn) layer may be easily formed.

However, when the size of the copper (Cu) particles is less than 0.2 μm, oxidation may be generated on surfaces of the copper (Cu) particles to hinder the copper/tin (Cu/Sn) layer from being formed.

In addition, in the present mechanism, a melting temperature of the tin/bismuth (Sn/Bi) particles and a forming temperature of the copper/tin (Cu/Sn) layer need to be lower than a hardening temperature of the epoxy resin, the base resin.

When the melting temperature of the tin/bismuth (Sn/Bi) particles and the forming temperature of the copper/tin (Cu/Sn) layer are higher than the hardening temperature of the epoxy resin, the base resin may be first hardened, such that the melted tin/bismuth (Sn/Bi) particles may not move to the surfaces of the copper (Cu) particles and thus, the copper/tin (Cu/Sn) layer may not be formed.

In addition, a content of the tin/bismuth (Sn/Bi) particles with respect to the copper (Cu) particles for forming the copper/tin (Cu/Sn) layer may be 10 to 90 wt %.

When the content of the tin/bismuth (Sn/Bi) particles is less than 10 wt %, a size of the copper/tin (Cu/Sn) layer formed by a reaction of the tin/bismuth (Sn/Bi) particles to the copper (Cu) particles in the conductive resin layer is excessively increased, such that it may be difficult to dispose the conductive connecting part on the first electrode layer.

In addition, when the content of the tin/bismuth (Sn/Bi) particles exceeds 90 wt %, the tin/bismuth (Sn/Bi) particles react to each other, such that only sizes of the tin/bismuth (Sn/Bi) particles may be increased without forming the copper/tin (Cu/Sn) layer.

In addition, a content of tin (Sn) in the tin/bismuth (Sn/Bi) particles needs to be adjusted. In the present exemplary embodiment, a component reacting to the copper (Cu) particles to form the conductive connecting part may be tin (Sn), and a content (x) of Sn in $Sn_x$-$Bi_y$ may be 10% or more with respect to a content of copper (Cu) in order to secure a predetermined level or more of reactivity. When the content (x) of Sn is less than 10% with respect to the content of copper (Cu), equivalent series resistance (ESR) may be increased.

In the multilayer ceramic capacitor in which the conductive resin layer is used in the external electrode, ESR may be affected by all of several kinds of resistance components applied to the external electrode.

An example of these resistance components may include resistance of the first electrode layer, contact resistance between the conductive resin layer and the first electrode layer, resistance of the conductive resin layer, contact resistance between the second electrode layer and the conductive resin layer, and resistance of the second electrode layer.

Here, the resistance of the first electrode layer and the resistance of the second electrode layer, which are fixed values, may not be varied.

In a multilayer ceramic capacitor according to the related art in which a conductive resin layer is simply used in an external electrode, Comparative Example 1, a plurality of metal particles and the metal particles and a first electrode layer were separated from each other by a base resin, such that contact resistance between the conductive resin layer and the first electrode layer and contact resistance between a second electrode layer and the conductive resin layer were large. As a result, ESR of the multilayer ceramic capacitor was 28.5 MΩ, which is large.

As Comparative Example 2, there is a multilayer ceramic capacitor having an external electrode structure configured so that a plurality of metal particles are connected to each other using a low melting point metal.

In this case, connectivity between the metal particles was increased, such that conductivity of a base resin was increased, and resistance of a conductive resin layer was decreased, such that ESR of the multilayer ceramic capacitor was slightly decreased to 26.1 MΩ as compared to Comparative Example 1. However, electricity flows in a tunneling scheme in a state in which a first electrode layer and the low melting point metal are separated from each other by a base resin, such that ESR is slightly decreased as compared to Comparative Example 1.

In the Inventive Example, copper (Cu) particles, tin/bismuth (Sn/Bi) particles, an oxide film remover, and 4 wt % to 15 wt % of epoxy resin were mixed with one another depending on the above-mentioned condition and were dispersed using a 3-roll-mill to prepare a conductive resin, and the conductive resin was applied onto a first electrode layer to form an external electrode.

According to Inventive Example, an intermetallic compound of a conductive resin layer of the external electrode was disposed on the first electrode layer, a conductive connecting part was formed in a base resin to contact the intermetallic compound to form a current channel, and the conductive connecting part was configured to surround a plurality of metal particles in a melted state and contact a second electrode layer to decrease contact resistance between the conductive resin layer and the first electrode layer and contact resistance between the second electrode layer and the conductive resin layer, such that ESR of a multilayer ceramic capacitor was significantly decreased to 18.5 MΩ.

In addition, in a case in which the conductive connecting part is formed of a low melting point metal having high conductivity, conductivity of the conductive resin layer is also improved, such that resistance of the conductive resin layer may also be decreased. Therefore, the ESR of the multilayer ceramic capacitor may be further decreased.

In addition, in the Inventive Example, adhesion and connectivity of the conductive resin layer may be increased by the conductive connecting part to improve warpage strength.

As illustrated in Table 1, in order to measure warpage strength, both ends of a board having a chip mounted on a central portion thereof are fixed, and the central portion of the board is pressed at a speed of 1 mm/sec using a tip.

A chip having a 1608 size is used in order to easily compare warpage strength influences.

In addition, a process of increasing a pressing speed by 1 mm/sec and measuring a change amount (ΔC) in capacitance of the chip at the increased pressing speed for five seconds was repeated. In this case, a case in which ΔC is 12.5% or more of a capacitance value (an initial value) of the chip before being bent was decided to be defective.

Referring to Table 1, in Inventive Example, a defect was not generated even at a bending depth of 10 mm.

TABLE 1

| Bending Depth (mm) | Comparative Example 1 (Defective Rate %) | Comparative Example 2 (Defective Rate %) | Inventive Example (Defective Rate %) |
|---|---|---|---|
| 1 | 0 | 0 | 0 |
| 2 | 20 | 0 | 0 |
| 3 | 80 | 0 | 0 |
| 4 | 100 | 10 | 0 |
| 5 | 100 | 40 | 0 |
| 6 | 100 | 40 | 0 |
| 7 | 100 | 50 | 0 |
| 8 | 100 | 60 | 0 |
| 9 | 100 | 60 | 0 |
| 10 | 100 | 60 | 0 |

Modified Example

Figure 14:
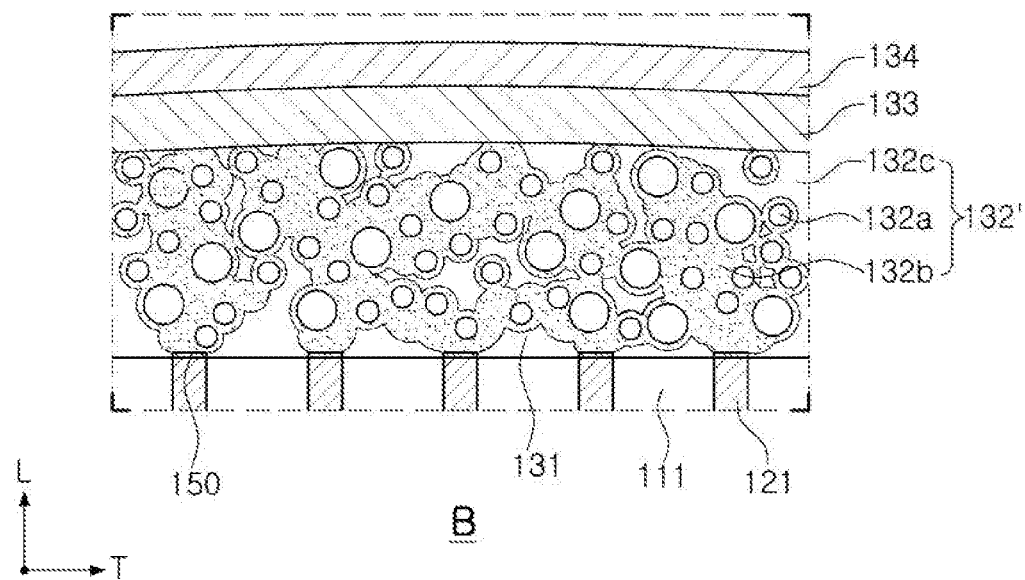
FIG. 14 is a schematic cross-sectional view illustrating a multilayer ceramic capacitor according to another exemplary embodiment in the present disclosure.

Referring to FIGS. 1, 2, and 14, a multilayer ceramic capacitor according to another exemplary embodiment in the present disclosure may include a body 110, intermetallic compounds 150, and first and second external electrodes 130 and 140.

The body 110 may include a plurality of dielectric layers 111 and first and second internal electrodes 121 and 122 disposed to be alternately exposed through both surfaces of the body 110 in the length direction of the body 110 with respective dielectric layers 111 interposed therebetween.

The intermetallic compounds 150 may be disposed on both surfaces of the body 110 in the length direction of the body 110 to contact exposed portions of the first and second internal electrodes 121 and 122, respectively.

The intermetallic compound 150 may have a form of a plurality of islands, if necessary, and the plurality of islands may have a layer form.

The first and second external electrodes 130 and 140 may be disposed on both surfaces of the body 110 in the length direction of the body 110, respectively, to cover the intermetallic compounds 150.

A description will hereinafter be provided in relation to the first external electrode 130, but may be considered to include a description of the second external electrode 140.

The first external electrode 130 may be disposed on one surface of the body 110 to cover the intermetallic compound 150, and may include a conductive resin layer 132 including a plurality of metal particles 132a, a conductive connecting part 132b, and a base resin 132c, and second electrode layers 133 and 134 disposed on the conductive resin layer 132 and contacting the conductive connecting part of the conductive resin layer 132.

In this case, the conductive connecting part 132b may contact the intermetallic compound 150, and surround the plurality of metal particles 132a in a melted state to connect the plurality of metal particles 132a to one another.

According to the structure described above, bending stress of a first electrode layer generated at the time of bending a chip due to absence of the first electrode layer may be solved, such that warpage strength may be further improved as compared to the above-mentioned exemplary embodiment.

In this case, a metal included in the conductive connecting part 132b may have a melting point lower than a hardening temperature of the base resin 132c.

In addition, the metal of the conductive connecting part 132b may be a metal having a low melting point of 300° C. or less.

The intermetallic compound 150 may be disposed in a form of a plurality of islands on the first electrode layer 131. In addition, the plurality of islands may have a layer form.

As set forth above, according to the exemplary embodiment in the present disclosure, the conductive resin layer of the external electrode disposed on the first electrode layer may include the conductive connecting part and the intermetallic compound contacting the first electrode layer and the conductive connecting part, and the conductive connecting part may contact the plurality of metal particles and the second electrode layer, such that the ESR of the multilayer ceramic capacitor may be decreased and the warpage strength may be improved.

While exemplary embodiments have been shown and described above, it will be apparent to those skilled in the art that modifications and variations could be made without departing from the scope of the present invention as defined by the appended claims.

What is claimed is:

1. A method of manufacturing a multilayer capacitor, comprising:
   preparing a body including dielectric layers and internal electrodes;
   forming a first electrode layer by applying a paste including a conductive metal and glass to one surface of the body to be electrically connected to one end of the internal electrodes and then firing the paste;
   applying a conductive resin composite to the first electrode layer, the conductive resin composite including metal particles, a thermosetting resin, and a low-melting-point metal having a melting point lower than a hardening temperature of the thermosetting resin;
   forming a conductive resin layer so that a melted low-melting-point metal becomes a conductive connecting part surrounding the metal particles and an intermetallic compound is formed between the first electrode layer and the conducive connecting part by hardening the conductive resin composite; and
   forming a second electrode layer on the conductive resin layer by plating,
   wherein the first electrode layer includes copper,
   the metal particles of the conductive resin layer are formed of at least one selected from the group consisting of copper, nickel, silver, copper coated with silver, and copper coated with tin,
   the intermetallic compound is formed of copper-tin,
   low-melting-point metal particles included in the thermosetting resin are composed of Sn—Bi, and a content (x) of Sn in $Sn_x$—$Bi_y$ is 10 wt % or more with respect to a total content of metal,
   the forming of the conductive resin layer includes:
   removing oxide films from surfaces of metal particles and the low-melting-point metal particles included in the thermosetting resin; and forming the conductive connecting part by a reaction between the metal particles from which the oxide films are removed and the low-melting-point metal particles from which the oxide films are removed and forming the intermetallic compound contacting the first electrode layer by allowing the low-melting-point metal particles having flowability to flow into the surroundings of the first electrode layer, and after removing the oxide films, a content of carbon in the low-melting-point metal particles formed of Sn—Bi is 0.5% to 1.0%.

2. The method of manufacturing a multilayer capacitor of claim 1, wherein the metal particles are formed of copper, and the low-melting-point metal particles further include at least one selected from the group consisting of Sn—Pb, Sn—Cu, Sn—Ag, and Sn—Ag—Cu.

3. The method of manufacturing a multilayer capacitor of claim 1, wherein the metal particles have a size of 0.2 µm to 20 µm.

4. The method of manufacturing a multilayer capacitor of claim 1, wherein a content of the low-melting-point metal is 10 wt % to 90 wt % with respect to a total content of metal.

5. The method of manufacturing a multilayer capacitor of claim 1, wherein the melting point of the low-melting-point metal is 300° C. or less.

6. A method of manufacturing a multilayer capacitor, comprising:

preparing a body including dielectric layers and internal electrodes;

forming a first electrode layer by applying a paste including a conductive metal and glass to one surface of the body to be electrically connected to one end of the internal electrodes and then firing the paste;

applying a conductive resin composite to the first electrode layer, the conductive resin composite including metal particles, a thermosetting resin, and a low-melting-point metal having a melting point lower than a hardening temperature of the thermosetting resin;

forming a conductive resin layer so that a melted low-melting-point metal becomes a conductive connecting part surrounding the metal particles and an intermetallic compound is formed between the first electrode layer and the conducive connecting part by hardening the conductive resin composite; and forming a second electrode layer on the conductive resin layer by plating, wherein in the forming of the conductive resin layer, the intermetallic compound is formed in a form of a plurality of islands, low-melting-point metal particles included in the thermosetting resin are formed of Sn—Bi, and a content (x) of Sn in $Sn_x$—$Bi_y$ is 10 wt % or more with respect to a total content of metal, the forming of the conductive resin layer includes:
removing oxide films from surfaces of metal particles and the low-melting-point metal particles included in the thermosetting resin; and forming the conductive connecting part by a reaction between the metal particles from which the oxide films are removed and the low-melting-point metal particles from which the oxide films are removed and forming the intermetallic compound contacting the first electrode layer by allowing the low-melting-point metal particles having flowability to flow into the surroundings of the first electrode layer, and after removing the oxide films, a content of carbon in the low-melting-point metal particles formed of Sn—Bi is 0.5% to 1.0%.

7. The method of manufacturing a multilayer capacitor of claim 6, wherein the plurality of islands are formed in a layer form.

8. A method of manufacturing a multilayer capacitor, comprising:

preparing a body including dielectric layers and internal electrodes;

forming a first electrode layer by applying a paste including a conductive metal and glass to one surface of the body to be electrically connected to one end of the internal electrodes and then firing the paste;

applying a conductive resin composite to the first electrode layer, the conductive resin composite including metal particles, a thermosetting resin, and a low-melting-point metal having a melting point lower than a hardening temperature of the thermosetting resin;

forming a conductive resin layer so that a melted low-melting-point metal becomes a conductive connecting part surrounding the metal particles and an intermetallic compound is formed between the first electrode layer and the conducive connecting part by hardening the conductive resin composite;

forming a nickel (Ni) plating layer on the conductive resin layer by plating; and forming a tin (Sn) plating layer on the nickel (Ni) plating layer by plating, wherein the first electrode layer includes copper, the metal particles of the conductive resin layer are formed of at least one selected from the group consisting of copper, nickel, silver, copper coated with silver, and copper coated with tin, the intermetallic compound is formed of copper-tin, the forming of the conductive resin layer includes:
removing oxide films from surfaces of metal particles and low-melting-point metal particles included in the thermosetting resin; and forming the conductive connecting part by a reaction between the metal particles from which the oxide films are removed and the low-melting-point metal particles from which the oxide films are removed and forming the intermetallic compound contacting the first electrode layer by allowing the low-melting-point metal particles having flowability to flow into the surroundings of the first electrode layer, the low-melting-point metal particles included in the thermosetting resin are formed of Sn—Bi, and a content (x) of Sn in $Sn_x$—$Bi_y$ is 10 wt % or more with respect to a total content of metal, and after removing the oxide films, a content of carbon in the low-melting-point metal particles formed of Sn—Bi is 0.5% to 1.0%.

9. The method of manufacturing a multilayer capacitor of claim 8, wherein the metal particles are formed of copper, and the low-melting-point metal particles additionally include one selected from the group consisting of Sn—Pb, Sn—Cu, Sn—Ag, and Sn—Ag—Cu.

10. The method of manufacturing a multilayer capacitor of claim 8, wherein the metal particles have a size of 0.2 µm to 20 µm.

11. The method of manufacturing a multilayer capacitor of claim 8, wherein a content of the low-melting-point metal is 10 wt % to 90 wt % with respect to a total content of metal.

12. The method of manufacturing a multilayer capacitor of claim 8, wherein the melting point of the low-melting-point metal is 300° C. or less.

\* \* \* \* \*